(12) United States Patent
Kim et al.

(10) Patent No.: US 6,198,516 B1
(45) Date of Patent: Mar. 6, 2001

(54) LCD HAVING TFT FORMED AT AN INTERSECTION OF DATA AND CAPACITOR LINES

(75) Inventors: Choong Hoo Kim, Pusan; Jae Hak Shin; Jin San Park, both of Kyoungki-do, all of (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/469,132

(22) Filed: Dec. 21, 1999

(30) Foreign Application Priority Data

Dec. 24, 1998 (KR) .................................................. 98-57984

(51) Int. Cl.[7] ........................... G02F 1/1343; G02F 1/136
(52) U.S. Cl. ................................ 349/39; 349/46; 349/139
(58) Field of Search .................................. 349/38, 39, 43, 349/139, 48, 46

(56) References Cited

U.S. PATENT DOCUMENTS

| | | | |
|---|---|---|---|
| 5,151,806 | 9/1992 | Kawamoto et al. | 349/38 |
| 5,159,476 | * 10/1992 | Hayashi | 349/39 |
| 5,337,173 | * 8/1994 | Atsumi et al. | 349/39 |
| 5,394,258 | * 2/1995 | Morin et al. | 349/39 |
| 5,777,700 | 7/1998 | Kaneko et al. | 349/39 |
| 5,790,222 | 8/1998 | Kim | 349/139 |
| 5,852,482 | 12/1998 | Kim | 349/46 |

FOREIGN PATENT DOCUMENTS

| | | |
|---|---|---|
| 9-5786 | 1/1997 | (JP) . |
| 10-268357 | 10/1998 | (JP) . |
| 10-288794 | 10/1998 | (JP) . |
| 11-15022 | 1/1999 | (JP) . |

* cited by examiner

*Primary Examiner*—William L. Sikes
*Assistant Examiner*—Toan Ton
(74) *Attorney, Agent, or Firm*—Selitto & Associates, P.C.

(57) ABSTRACT

Disclosed is a thin film transistor liquid crystal display capable of fast operation and having enhanced display quality. The thin film transistor liquid crystal display comprises a transparent insulating substrate; gate lines and storage lines arranged on the transparent insulating substrate in rows parallel to each other alternatively; data lines arranged in columns perpendicular to the gate lines and the storage lines so as to define pixel areas; a first pixel area defined by a pair of gate lines and a pair of data lines, and a second pixel area defined by a pair of storage lines and a pair of data lines; and a first thin film transistor disposed adjacent to an intersection of the gate line and the data line and in contact with the first pixel electrode on an upper position, and a second thin film transistor disposed adjacent to an intersection of the storage line and the data line and in contact with the second pixel electrode on a lower position.

5 Claims, 4 Drawing Sheets

LCD HAVING TFT FORMED AT AN INTERSECTION OF DATA AND CAPACITOR LINES

BACKGROUND OF THE INVENTION

1. Field of the Invention

The present invention generally relates to a thin film transistor liquid crystal display, and more particularly to a thin film transistor liquid crystal display capable of fast driving and having enhanced display quality.

2. Description of the Related Art

The thin film transistor liquid crystal display (hereinafter "TFT-LCD") has advantages of excellent response characteristics and is appropriate for high number of pixels, so that the TFT-LCD is able to realize high display quality and large size of display devices comparable with the cathode ray tube (CRT).

The TFT-LCD comprises a TFT array substrate in which a thin film transistor and a pixel electrode are formed, a color filter substrate in which a color filter and a counter electrode are formed, and a liquid crystal layer sandwiched between the TFT array substrate and the color filter substrate.

In the TFT-LCD, it is required to obtain excellent display quality that a first signal applied from data line should be uniformly maintained until a second signal is applied. So as to uniformly maintain the applied signal, a storage electrode for obtaining a storage capacitance $C_{st}$ is provided at each pixel. The storage electrode is provided in the form of a line separated from a gate line, or in another form protruding from the gate line. The former type is called as "storage on common" and the later "storage on gate".

FIG. 1 is a plane view for showing a TFT array substrate provided with a conventional storage electrode of the storage on gate type. As shown in the drawing, a plurality of gate lines 1 are arranged in rows and a plurality of data bus lines 4 are arranged perpendicular to the gate lines 1. A storage electrode 2 is provided in the form protruding from the gate line 1 within the pixel area defined by a pair of gate lines 1 and a pair of data lines 4. A pixel electrode 6 made of a transparent metal layer, for example an ITO metal layer, is disposed to be overlapped with the storage electrode 2 within the pixel area.

A TFT 10 is formed at a portion of intersection of the gate line 1 and the data line 4. The TFT 10 includes a gate electrode, i.e. a part of the gate line 1, a source electrode 7 and a drain electrode 8 disposed to be overlapped with the gate electrode. The drain electrode 8 has a form withdrawn from the data line 4, and the source electrode 7 is disposed to be opposed with the drain electrode 8 and in contact with the pixel electrode 6.

However, it is very difficult to utilize the fast operation in the TFT-LCD having the above-described TFT array substrate since there is occurred RC-Delay due to a storage capacitance $C_{st}$, a parasitic capacitance $C_{gs}$ between a part of the gate line i.e. the gate electrode and the source electrode, and a parasitic capacitance $C_{gd}$ between the gate electrode and the drain electrode defined as following equation 1.

$$\tau = R \cdot C_{total} = R \cdot (\Sigma C_{gs} + \Sigma C_{gd} \Sigma C_{st}) \qquad \text{equation 1}$$

Herein, $\tau$ means a degree of signal delay and R means resistance value of the gate line.

Further, the TFT array substrate as constituted above is formed conventionally by a divisional exposure process. However, as shown in FIGS. 2a and 2b, the overlapping rate of a part of the gate line 1, i.e. the gate electrode and the source electrode 7, and the overlapping rate of the gate electrode and the drain electrode 8 are changed due to a misalign of an exposing mask, thereby occurring changes in the value of parasitic capacitance. Therefore, as shown in following equation 2, display quality is degraded due to the difference of brightness between the respective divisional exposure regions.

$$\Delta V_p = C_{gs}/C_{gs} + C_{lc} + C_{st} X \Delta V_g \qquad \text{equation 2}$$

Herein, $\Delta V_p$ means the variation of pixel voltage, i.e. the kick-back voltage, $C_{gs}$ means a parasitic capacitance between the gate electrode and the source electrode, $C_{lc}$ means a parasitic capacitance of liquid crystal, and $\Delta V_g$ means the variation of gate voltage.

SUMMARY OF THE INVENTION

Accordingly, it is the object of the invention to provide a TFT-LCD capable of fast driving and having enhanced display quality.

The TFT-LCD of the present invention comprises: a transparent insulating substrate; gate lines and storage lines arranged on the transparent insulating substrate in rows parallel to each other alternatively; data lines arranged in columns perpendicular to the gate lines and the storage lines so as to define pixel areas; a first pixel area defined by a pair of gate lines and a pair of data lines, and a second pixel area defined by a pair of storage lines and a pair of data lines; and a first thin film transistor disposed adjacent to an intersection of the gate line and the data line and in contact with the first pixel electrode on an upper position, and a second thin film transistor disposed adjacent to an intersection of the storage line and the data line and in contact with the second pixel electrode on a lower position.

BRIEF DESCRIPTION OF THE DRAWINGS

The above and further objects and features of the invention will more fully be apparent from the following detailed description with accompanying description with accompanying drawings.

DETAILED DESCRIPTION OF THE INVENTION

Figure 1:
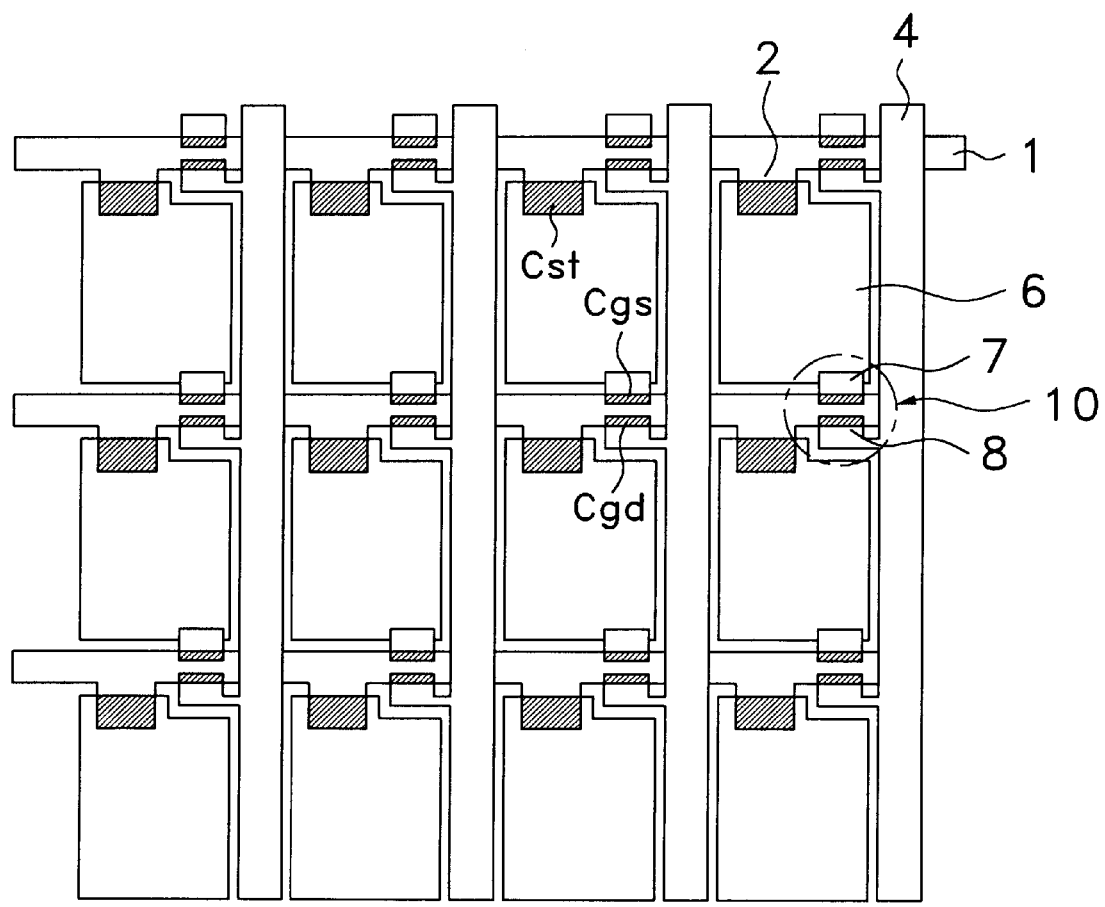
FIG. 1 is a plane view showing a TFT array substrate provided with the conventional storage electrode of the storage on gate type.
Figure 2A:
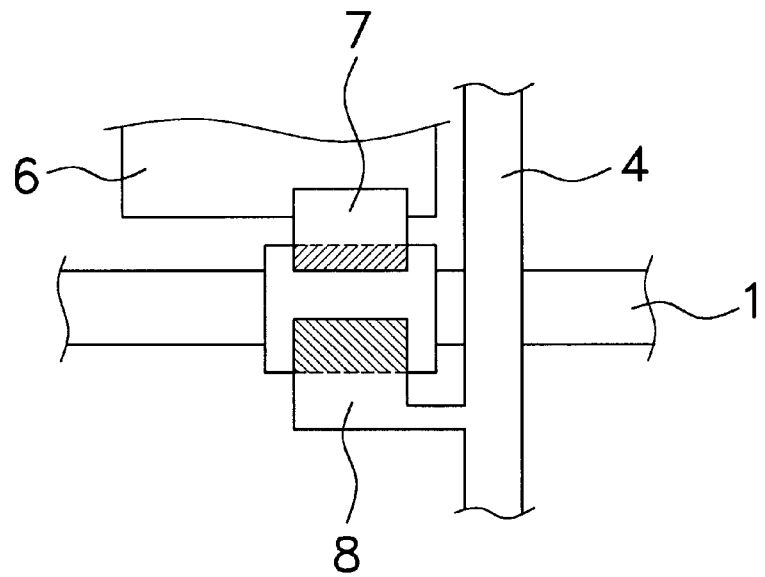
FIGS. 2A and 2B illustrate the variation of parasitic capacitance due to the conventional divisional exposure process.
Figure 2B:
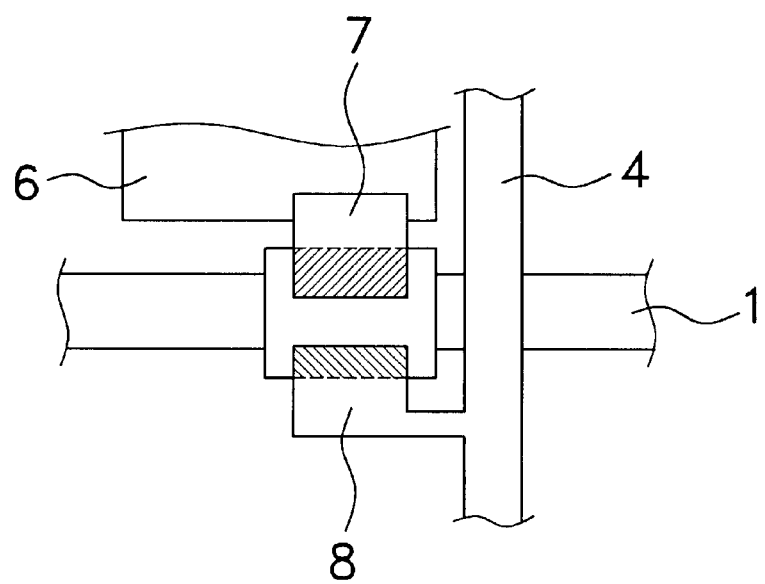
Figure 3:
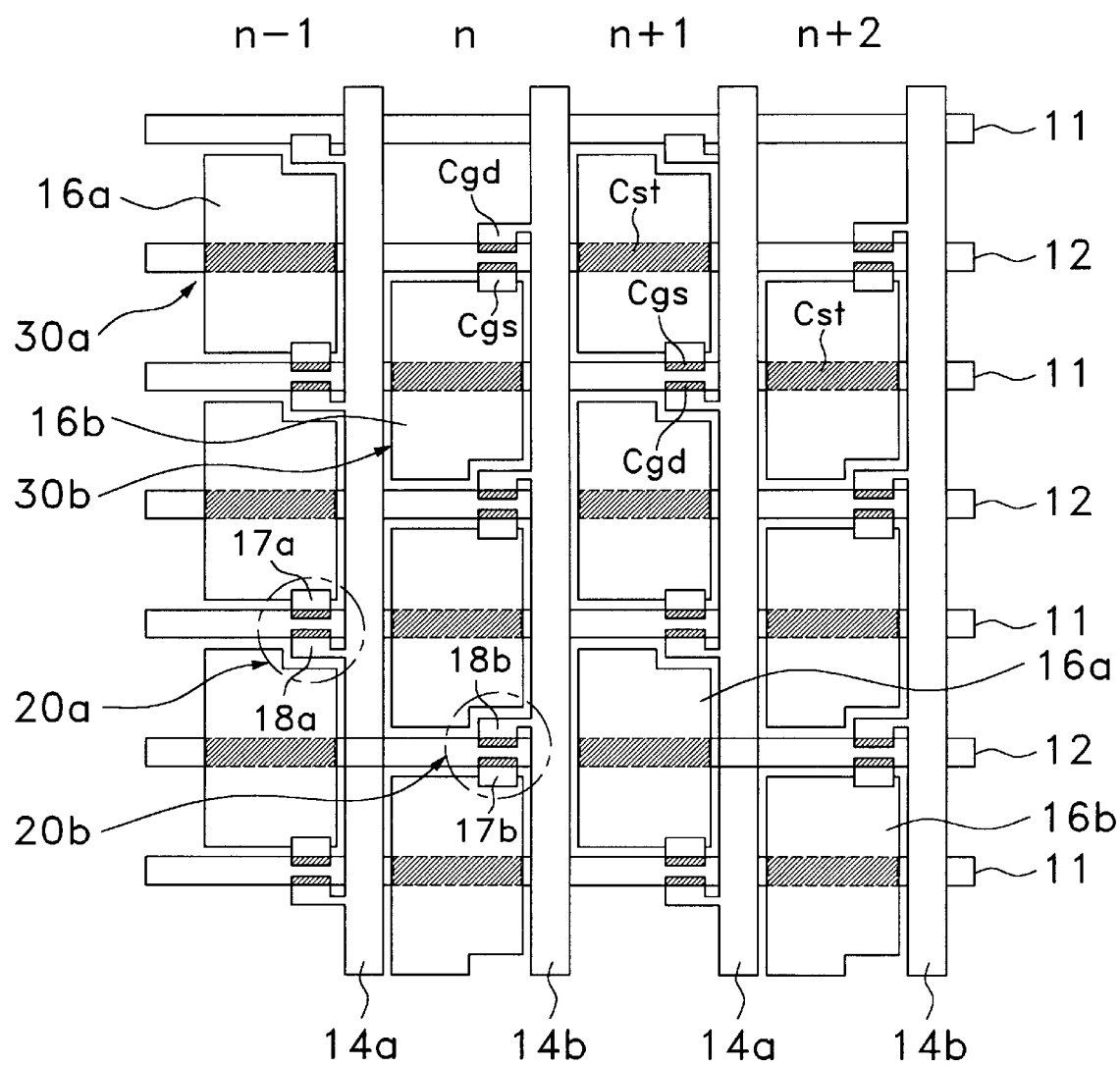
FIG. 3 is a plane view showing a TFT array substrate of a TFT-LCD according to the present invention.

Referring to FIG. 3, a plurality of gate lines 11 are arranged in parallel in rows, and storage lines 12 are arranged between adjoining gate lines one by one in parallel with the gate lines 11. A plurality of data lines 14a, 14b are arranged perpendicular to the storage line 12, so that pixel areas 30a, 30b are defined.

The pixel areas 30a, 30b include a first pixel area 30a and a second pixel area 30b. Herein, the first pixel area 30a is defined by a pair of gate lines 11 and a pair of data lines 14a, 14b, and the second pixel area 30b is defined by a pair of storage lines 12 and a pair of data bus lines 14a, 14b. In drawings, the first pixel area 30a is disposed at an odd-numbered pixel column(n−1, n+1) and the second pixel area 30b is disposed at an even-numbered pixel column(n, n+2). Furthermore, the first pixel area 30a and the second pixel area 30b are shifted by about a half toward columns since the storage lines 12 are disposed between the gate lines 11.

A first pixel electrode 16a is disposed to be overlapped with the storage line 12 at the first pixel area 30a disposed at the odd-numbered pixel column(n−1, n+1), and a second pixel electrode 16b is disposed to be overlapped with the gate line 11 at the second pixel area 30b disposed at the even-numbered pixel column(n, n+2).

A first TFT 20a is disposed adjacent to an intersection of the gate line 11 and the data line 14a, and a second TFT 20b is disposed at a portion of intersection of the storage line 12 and the data line 14b. The first and the second TFTs 20a, 20b include gate electrodes, drain electrodes 18a, 18b withdrawn from the data lines 14a, 14b and source electrodes 17a, 17b opposed to the drain electrodes 18a, 18b and in contact with the pixel electrodes 16a, 16b. The gate electrode of the first TFT 20a is a part of the gate line 11, and the gate electrode of the second TFT 20b is a part of the storage line 12. The source electrode 17a of the first TFT 20a is in contact with a first pixel electrode disposed at a previous row, and the source electrode 17b of the second TFT 20b is in contact with a second pixel electrode disposed at a next row.

The advantage of the TFT-LCD equipped with a TFT array substrate according to the embodiment of the present invention is as follows.

A storage electrode to obtain storage capacitance $C_{st}$, at each pixel, is equipped as the storage on common type, and the storage capacitance $C_{st}$ is obtained between the storage line 12 and the first pixel electrode 16a, and between the gate line 11 and the second pixel electrode 16b.

When a signal voltage is applied to the gate line 11, a parasitic capacitance, for example $C_{gs}$, $C_{gd}$ and $C_{st}$ at the gate line 11 is occurred not at the even-numbered pixel column(n, n+2) but at the odd-numbered pixel column (n−1, n+1). Accordingly, the parasitic capacitance at the gate line 11 is reduced by half of the conventional device, thereby reducing the signal delay at the gate line 11 compared to the conventional device. Consequently, fast operation of the TFT-LCD is possible.

Further, the storage line 12 according to the embodiment of the present invention functions as a gate line. On the contrary to the parasitic capacitance at the gate line 11, the parasitic capacitance at the storage line 12 is occurred not at the odd-numbered pixel column(n−1, n+1) but at the even-numbered pixel column (n, n+2). Accordingly, when a gate signal is applied to the storage line 12 the signal delay at the storage line 12 is reduced compared to the conventional device. Fast operation of the TFT-LCD is also possible.

Furthermore, the source electrodes 17a, 17b and the drain electrodes 18a, 18b of the TFTs 20a, 20b are arranged at the same location within the pixel columns, however they are arranged at the opposite location between the pixel column. Therefore, if a difference $\Delta V_p$ of brightness value originated from the misalign of the exposing mask is occurred between the exposure regions, there is occurred a difference of brightness value between the pixel columns. However, since a compensation of the brightness is carried out between the pixel columns, a totally uniform brightness is obtained. Therefore, display quality of the TFT-LCD equipped with the TFT array substrate according to the embodiment of the present invention, is superior to that of the conventional TFT-LCD equipped with the conventional TFT array substrate.

Figure 4:
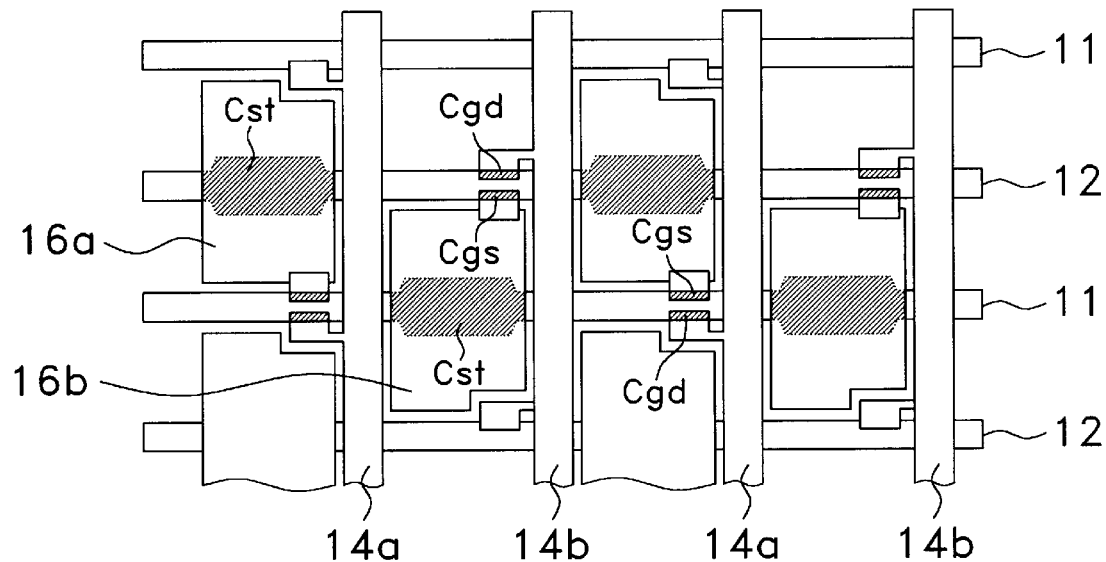
FIG. 4 is a plane view showing a TFT array substrate of a TFT-LCD according to another embodiment of the present invention.

FIG. 4 is a plane view showing a TFT array substrate of a TFT-LCD according to another embodiment of the present invention. As shown in the drawing, in order to obtain increased storage capacitance $C_{st}$, a gate line 11 is formed such that a portion thereof overlapped with a first pixel electrode 16a has a wider line width than other regions. Further, similar to the gate line 11, a storage line 12 is formed such that a portion thereof overlapped with a second pixel electrode 16b has a wider line width than other regions in order to obtain increased storage capacitance $C_{st}$.

Figure 5:
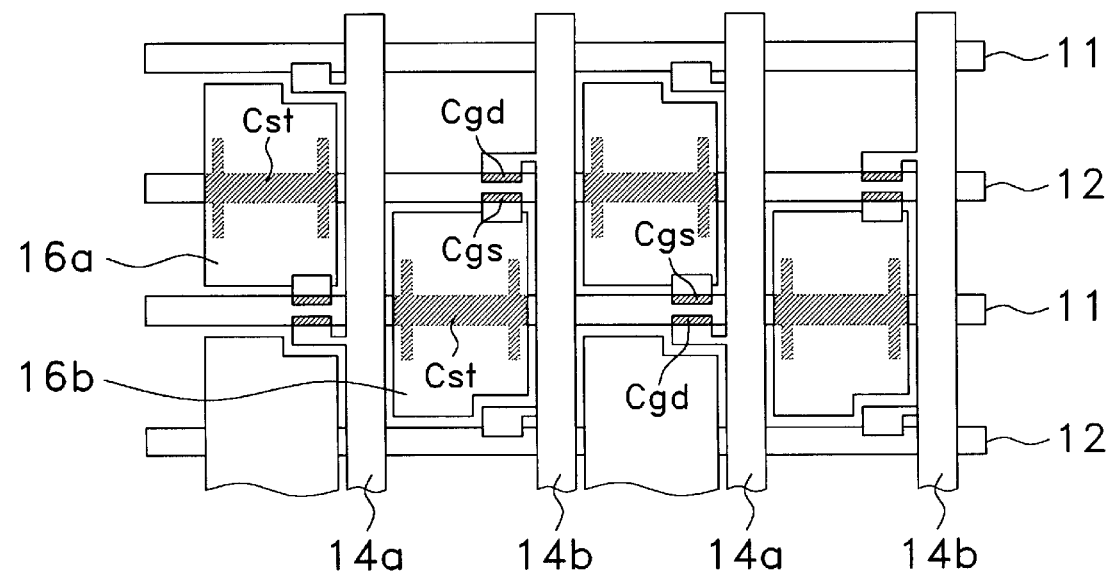
FIG. 5 is a plane view showing a TFT array substrate of a TFT-LCD according to still another embodiment of the present invention.

FIG. 5 is a plane view showing a TFT array substrate of a TFT-LCD according to still another embodiment of the present invention. As shown in the drawing, a gate line 11 and a storage line 12 are arranged such that an overlapping portion of a first pixel electrode 16a and a second pixel electrode 16b is formed in a shape of the letter "H" so as to obtain increased storage capacitance $C_{st}$.

As described in the above specification, the TFT-LCD of the present invention is capable of reducing gate signal delay by changing the pixel arrangement of the TFT array substrate. By doing so, fast operation of the TFT-LCD is possible. Further, totally uniform brightness is obtained in the overall display area by arranging source and drain electrodes of the TFT at the opposition locations of the respective pixel rows. Therefore, enhanced display quality is obtained.

While the present invention has been described with reference to certain preferred embodiments, various other modifications will be apparent to and can be readily made by those skilled in the art without departing from the scope and spirit of the present invention.

What is claimed is:

1. A thin film transistor liquid crystal display comprising:
   a transparent insulating substrate;
   gate lines and storage lines arranged on the transparent insulating substrate in rows parallel to each other alternatively;
   data lines arranged in columns perpendicular to the gate lines and the storage lines so as to define pixel areas;
   a first pixel area defined by a pair of gate lines and a pair of data lines, and a second pixel area defined by a pair of storage lines and a pair of data lines; and
   a first thin film transistor disposed adjacent to an intersection of the gate line and the data line and in contact with the first pixel electrode on an upper position, and a second thin film transistor disposed adjacent to an intersection of the storage line and the data line and in contact with the second pixel electrode on a lower position.

2. The thin film transistor liquid crystal display of claim 1, wherein the gate line is formed such that a portion thereof overlapped with the second pixel electrode has a wider line width than other regions.

3. The thin film transistor liquid crystal display of claim 1, wherein the storage line is formed such that a portion thereof overlapped with the first pixel electrode has a wider line width than other regions.

4. The thin film transistor liquid crystal display of claim 1, wherein the gate line is formed such that a portion thereof overlapped with the second pixel electrode is formed in a shape of the letter "H".

5. The thin film transistor liquid crystal display of claim 1, wherein the storage line is formed such that a portion thereof overlapped with the first pixel electrode is formed in a shape of the letter "H".

* * * * *